(12) United States Patent
Mueller

(10) Patent No.: US 11,170,337 B2
(45) Date of Patent: Nov. 9, 2021

(54) AUTHENTICATED TRANSFER OF AN ARTICLE USING VERIFICATION TOKENS

(71) Applicant: NewStore Inc., Boston, MA (US)

(72) Inventor: Ulrike Vanessa Mueller, Boston, MA (US)

(73) Assignee: NewStore Inc., Boston, MA (US)

( * ) Notice: Subject to any disclaimer, the term of this patent is extended or adjusted under 35 U.S.C. 154(b) by 1321 days.

(21) Appl. No.: 15/278,387

(22) Filed: Sep. 28, 2016

(65) Prior Publication Data

US 2017/0091699 A1 Mar. 30, 2017

Related U.S. Application Data

(60) Provisional application No. 62/233,792, filed on Sep. 28, 2015.

(51) Int. Cl.
| | | |
|---|---|---|
| *G06Q 10/08* | (2012.01) | |
| *G06Q 20/40* | (2012.01) | |
| *H04W 4/80* | (2018.01) | |
| *H04W 4/02* | (2018.01) | |
| *G06Q 20/32* | (2012.01) | |
| *H04L 29/08* | (2006.01) | |
| *G06Q 20/38* | (2012.01) | |
| *H04W 12/06* | (2021.01) | |
| *H04W 4/06* | (2009.01) | |
| *H04W 12/63* | (2021.01) | |

(52) U.S. Cl.
CPC ....... *G06Q 10/083* (2013.01); *G06Q 20/3224* (2013.01); *G06Q 20/382* (2013.01); *G06Q 20/401* (2013.01); *H04L 67/18* (2013.01); *H04W 4/023* (2013.01); *H04W 4/80* (2018.02); *H04W 4/06* (2013.01); *H04W 12/06* (2013.01); *H04W 12/63* (2021.01)

(58) Field of Classification Search
CPC .... G06Q 10/083; G06Q 20/401; H04W 12/06
See application file for complete search history.

(56) References Cited

U.S. PATENT DOCUMENTS

| | | | |
|---|---|---|---|
| 7,000,110 B1 * | 2/2006 | Terao | H04L 9/3218 380/28 |
| 7,685,020 B2 | 3/2010 | Do et al. | |
| 7,848,953 B2 | 12/2010 | Kahlon et al. | |

(Continued)

OTHER PUBLICATIONS

Parcel2Go welcomes launch of nightline 'parcel motels': A new parcel delivery concept designed to allow consumers in Ireland ultimate . . . (Aug. 1, 2012). PR Newswire Retrieved on Jul. 3, 2021 from <URL:https://dialog.proquest.com/professional/docview/1030437381?accountid=131444> (Year: 2012).*

*Primary Examiner* — Abhishek Vyas
*Assistant Examiner* — Monica A Mandel
(74) *Attorney, Agent, or Firm* — Intrinsic Law Corp.

(57) ABSTRACT

Aspects of the invention provide a system and method for effecting a transfer of goods in a transaction. Mobile communication devices held by parties to a transaction deliver geographic location information to a server, which coordinates data, including verification token data broadcast by one of said devices, so as to authenticate the identities of the parties to the transfer once the parties or devices are within a specified short-range to conduct said transfer.

18 Claims, 14 Drawing Sheets

(56) References Cited

U.S. PATENT DOCUMENTS

| | | |
|---|---|---|
| 8,352,382 B1 | 1/2013 | Katta et al. |
| 8,533,053 B2 | 9/2013 | Brown et al. |
| 8,682,802 B1 * | 3/2014 | Kannanari ............ G06Q 20/401 |
| | | 705/65 |
| 8,862,333 B2 | 10/2014 | Andres et al. |
| 8,989,053 B1 * | 3/2015 | Skaaksrud ......... G06K 7/10366 |
| | | 370/255 |
| 2003/0171962 A1 | 9/2003 | Hirth et al. |
| 2005/0216505 A1 | 9/2005 | Chorley et al. |
| 2007/0255652 A1 * | 11/2007 | Tumminaro ............ G06Q 20/10 |
| | | 705/39 |
| 2013/0116964 A1 * | 5/2013 | van Roermund .... G06K 7/0008 |
| | | 702/141 |
| 2015/0170133 A1 * | 6/2015 | Love ................. G06Q 20/3224 |
| | | 705/44 |

* cited by examiner

AUTHENTICATED TRANSFER OF AN ARTICLE USING VERIFICATION TOKENS

CROSS-REFERENCE TO RELATED APPLICATIONS

This application is related to and claims priority to U.S. Provisional Patent Application No. 62/233,792, filed on Sep. 28, 2015, entitled "Delivery Authentication and Confirmation Utilizing Various Wireless Protocols and Networking," which is hereby incorporated by reference.

TECHNICAL FIELD

The present invention relates generally to transferring an article from one custodian to another using authenticated communications and verification tokens in a wireless network environment, including based on physical and geographic proximity of said custodians by way of mobile communication devices associated therewith.

BACKGROUND

Successful commerce in goods depends on efficient delivery of items to customers. For bulk shipments to retailers, manufacturers who do not maintain a fleet of trucks often hire independent carriers. As for delivery of products to end users, recent years have witnessed a dramatic growth in the volume of products shipped to end user customers from stores, from mail-order catalog warehouses to drop shipments directly from manufacturers. Presently parcel delivery carriers carry the burden to provide delivery services to end user customers whether they are individuals or businesses.

Surging shipping business has been fueled by the growth of e-commerce conducted over the Internet. Individuals and businesses find it convenient to order goods using a web-browser or a smart phone and a multitude of e-commerce sites offering a wide variety of goods have gone online. In addition to buying and selling goods and services, more firms are using the internet to manage their businesses.

For all of these transactions, a carrier is engaged to deliver the ordered goods. Historically, this step has been treated as a second transaction, often as complex and time consuming as the original sale of products. Carriers have offered various levels of service, ranging from ground delivery to overnight delivery and delivery early the next morning. Customers may visit a storefront drop-off station, drop off a parcel at a kiosk, or arrange for a regular pickup by the carrier. Telephone ordering of pickup as well as delivery services has been offered.

As various parcel delivery services have competed for business in recent years, delivery confirmation has become available in connection with an increasing variety of delivery services. For many years, the United States Postal Service (USPS) has provided delivery methods which make available to consumers sending mail features such as delivery confirmation (in paper form, provided through the U.S. Mail). Such services include return receipt requested services and certified mail.

In recent years, internet access to delivery confirmation and parcel tracking information has become available through a variety of carriers, including UPS, Federal Express, and the USPS. Delivery confirmation has become integral to e-commerce (and even private party to private party) transactions with an effort to mitigate risk and assign accountability to the responsible delivery of goods and services.

With its rise, e-commerce has also prompted a different, amalgamated experience; one that combines online retailing with brick and mortar shopping. A user browses a retail website, selects desired merchandise and pays (via a variety of methods) for the transaction. However, rather than selecting and paying for traditional delivery services, the retail server checks inventory at local brick and mortar stores and offers the user an option for local pickup.

The process of "crowdsourcing" relates to obtaining needed services, ideas, or content by soliciting contributions from a large group of people and especially from an online community, rather than from traditional employees or suppliers. This combines the efforts of numerous self-identified volunteers or part-time workers, where each contributor, acting on their own initiative, adds a small contribution that combines with those of others to achieve a greater result. Driving and delivery providers like Uber and Lift in the U.S. have recently expanded the choice of couriers that could be called on to carry merchandise from a provider of the merchandise to a receiver of the merchandise. However, such services do not necessarily offer the training, experience or security provisions offered by the major long-standing carriers. Therefore, especially in using alternative delivery services, merchants and buyers become subject to risks of loss, damage, fraud and other risks of carrying valuable goods across the country or across town.

Similar challenges exist when a consumer returns merchandise using a crowdsourced or alternative delivery service or directly to a brick and mortar establishment and desires electronic confirmation thereof. Other problems resulting from theft and fraud occur in the following examples associated with traditional delivery methods.

Another problem can arise if during delivery a person other than the intended recipient claims to be the recipient. This type of attack is difficult to prevent because at most a delivery company asks is the spelling of the last name to document the deliver. While some carriers require a signature, the carrier cannot generally authenticate a recipient's signature, and upon discovering that the signature is improper the goods have been delivered and the damage was done. Also, ordinary consumers who are returning merchandise to a retailer through a delivery carrier do not own or use signature pads to confirm the identity of the carrier (or alleged carrier) employee to whom they give the goods. While deliveries to a listed destination address usually assume that a person at the address is authorized to take deliveries to the address, some deliveries are arranged to non-traditional locales, for example an arrangement to take the goods at a café or other public place. Therefore, even traditional bonded and trained delivery drivers and their employers are prone to the above risks and challenges.

By way of example, a problematic scenario occurs when the deliverer fails to deliver the goods and claims the package was delivered. Even within the U.S. postal service, this type of theft is not uncommon. Some, and certainly not many, mail carriers have been found with volumes of undelivered packages dumped or stored illegally, presumably due to fraudulent intent or due to laziness and unwillingness to correctly deliver the packages.

The converse of the aforementioned scenario also occurs. In that, goods are delivered, but the recipient claims they were not received. This highlights the increased importance of delivery confirmation and signature required services, as there can be very little recourse for the sender. However, these services still suffer from shortcomings disclosed herein.

Other problematic scenarios include the carrier service delivering wrong, fewer or damaged goods. For example, perhaps a trucking service intentionally leaves fewer goods than what was ordered. Present day systems only prevent theft and fraud in so far as the recipient can verify the delivery before confirming the delivery. The present invention seeks to overcome these limitations and other drawbacks of the prior art and to provide new features not heretofore available.

What is needed are new, more secure and flexible systems and methods for delivering goods and services for modern day e-commerce/mobile device economies. A more comprehensive discussion of the features and advantages of the present invention is deferred to the following detailed description, which proceeds with reference to the accompanying drawings.

SUMMARY

The present invention discloses systems and methods for securely authenticating and confirming the delivery of goods within the context of modern day e-commerce economies. Aspects of the disclosure relate to a carrier utilizing GPS to determine the disposition of a delivery target or recipient. Specifically, geo-fencing, wireless protocol and token exchange enable a secure transfer of goods. The present disclosure contemplates a novel delivery system comprising a network for implementing authentication and delivery confirmation using integrated mobile device applications, as well as practical methods for the application thereof and remedying these and/or other associated problems.

This overview is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

As an example, two mobile phones running dedicated apps communicate with a predetermined server and each other. One phone broadcasts a signal representing the recipient of a prospect delivery. A second phone utilized by a delivery carrier and running a dedicated receives the signal and authenticates the recipient via electromagnetic communication. After delivery is affirmed by the recipient, a confirmation is sent to the server, in addition to verification tokens, and identifying information. In some embodiments, for added authentication, the parties may hash the verification tokens using a hash function, but this is not required of all embodiments.

One embodiment is directed to a method for causing a transfer of an article between a first and second custodians of said article, comprising coupling a transaction server, over at least one wireless communication path, using respective authenticated communication links, so as to establish respective authenticated communication links with each of a first mobile communication device co-located with the first custodian, and a second mobile communication device co-located with the second custodian; providing from said transaction server to the first and second mobile communication devices respective digital messages comprising transaction identifier data and other data regarding said transferring of the article from one of the first custodian and the second custodian to the other; determining, at said transaction server, respective physical locations of said first and second mobile communication devices with respect to one another based at least partly on respective first and second location data generated respectively by first and second geographic location circuits disposed in each of the corresponding first and second mobile communication devices; when said first and second mobile communication devices are within a pre-determined geographic proximity of one another, the transaction server instructing the first mobile communication device to broadcast over the air a short-range wireless radio frequency signal including at least said transaction identifier data using a first short-range wireless radio frequency communication transmitter therein; at the second mobile communication device, using a second short-range wireless radio frequency communication receiver to receive said short-range wireless radio frequency signal from the first mobile communication device, confirming the presence of said transaction identifier data in the short-range wireless radio frequency signal, and using the short-range wireless radio frequency signal to determine when said first and second mobile communication devices are within a pre-determined short range communication proximity of one another; when the second mobile communication device has confirmed the presence of said transaction identifier data and determined that said first and second mobile communication devices are within said pre-determined short-range communication proximity of one another, the second mobile communication device sending a proximity confirmation signal to the transaction server indicating that the first and second mobile communication devices are within said pre-determined short-range communication signal proximity of one another; after receiving said proximity confirmation signal from the second mobile communication device, the transaction server and the first mobile communication device exchanging a verification token with one another; the transaction server causing said first mobile communication device to wirelessly broadcast over the air using said short-range wireless radio frequency a composite signal comprising both the transaction identification data as well as the verification token; at the second mobile communication device, using a respective second short-range wireless radio frequency receiver to receive the composite signal including the verification token from the first mobile communication device and sending the received verification token from the second mobile communication device to the transaction server; at the transaction server, confirming that the verification token received from the second mobile communication device corresponds to the verification token exchanged with the first mobile communication device; and upon successfully confirming said verification tokens, the transaction server sending article transfer confirmation signals to each of the first and second mobile communication devices so as to effect a transfer of said article from the custodian having custody of the article to the other custodian.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Modern e-commerce processes require new ways for authenticating the legitimate recipient. For example, with in-store pickup (also called click & collect), a customer orders online and then picks up the purchase in a retail store. The customer must be authenticated as the legitimate recipient. Typically, a retailer requires some type of identification to be produced in order to authenticate the purchaser (recipient).

Authentication becomes more difficult for local delivery from a retail store through a courier service to arbitrary or changing locations. For example, current delivery options do not permit ad hoc delivery to a café, a park or some other public place. Nor do they allow for a recipient to change delivery destinations after an order has been placed. Or, if they do, they change is usually nominal rather than dynamic. Meaning, a recipient might be able to change the destination address from a residential address to the credit card's billing address.

The disclosed invention provides a system which uses smart phones and electromagnetic wave technologies (e.g., Wi-Fi, Bluetooth, GPS, etc.) and knowledge about the original online order to authenticate a legitimate recipient. The system also provides an electronic confirmation of the delivery. Among other advantages, this disclosure provides for secure methods for transferring articles among parties, such as when an article of commerce is transferred from a provider of the article to a recipient of the article.

In general, at least one person participating in a delivery is always moving towards a delivery location. For example, a customer will be walking to the retail store for pickup or the courier driving to the customer's address. For simplicity, the present disclosure uses the term "provider" for a person in possession of packages/goods. Similarly, "recipient" is used to refer the person who receives packages/goods who needs to be authenticated. The "provider" receives a delivery confirmation, as will be discussed in greater detail later in the application. Also, for the purpose of the present disclosure, "app" is used to identify an "application" program, typically but not necessarily on a mobile device, such as a smart phone.

Figure 1:
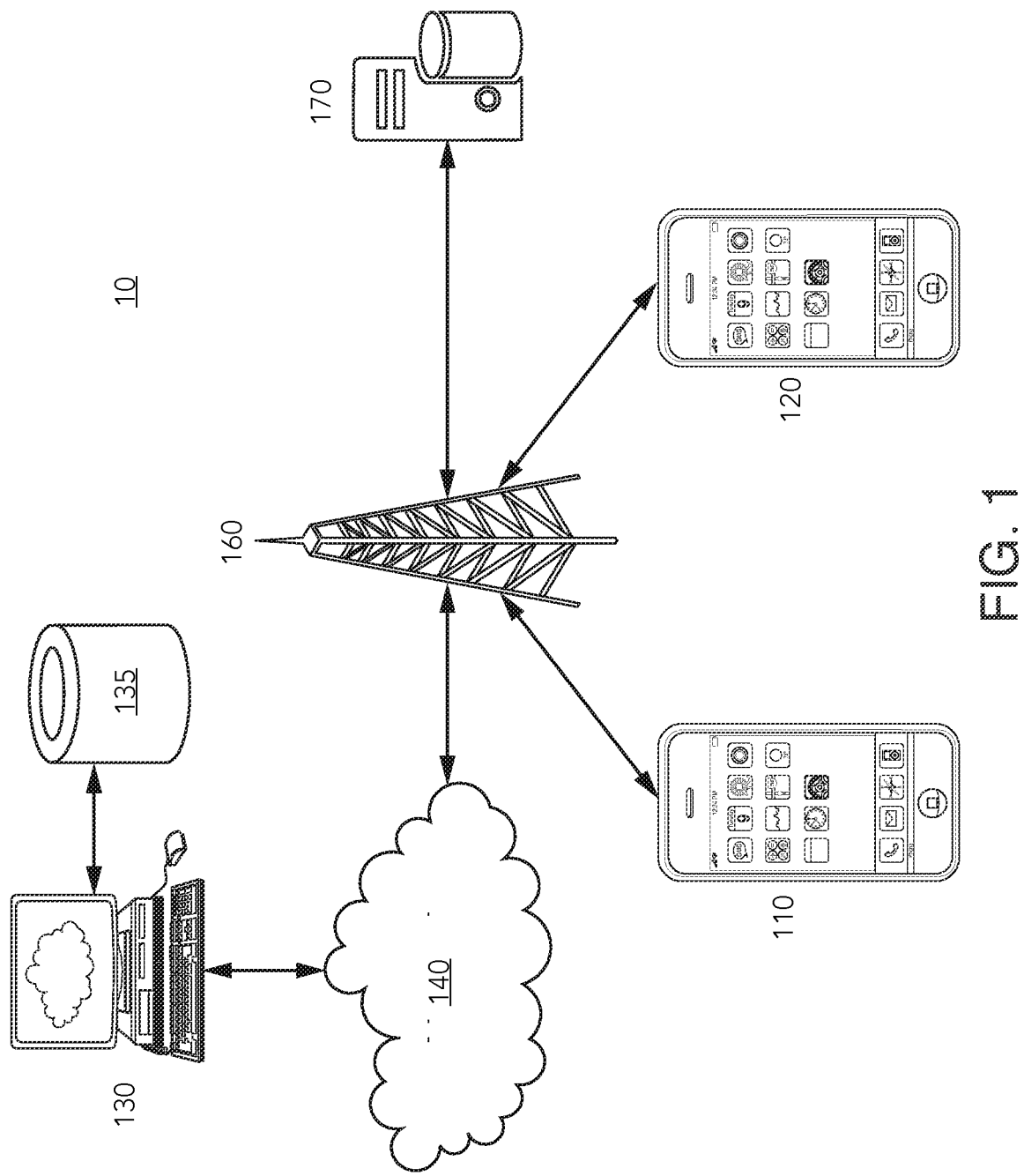
FIG. 1 is an exemplary system for delivery authentication and confirmation utilizing a wireless network, in accordance with some embodiments of the disclosure provided herein.

FIG. 1 illustrates an exemplary system or architecture 10 for delivery authentication and confirmation utilizing a wireless network, in accordance with some embodiments of the disclosure provided herein. The system 100 is generally network-based and can be carried out over a communication network including at least a portion thereof being a wireless communication network or network portion. Also, the network can include a cloud-based network 140, which can rely on Internet communications for example, and may support wireless communication protocols such as 802.11 Wi-Fi communications or others. The network can also include one or more messaging services including cellular communication systems, which rely on one or more cellular communication towers in a telecommunications network 160 coupled to one or more messaging servers 170. Altogether, the network or networks provide an infrastructure for communication among a plurality of connected devices and computing systems as shown. Other instances are possible as would be appreciated by one of skill in the art. For example, the mobile communication devices in the present examples may connect with other components of the system over any one or combination of wireless communication modalities (e.g., Wi-Fi, cellular data, etc.) and the illustrated examples are not intended to be limiting.

According to an aspect, each of the parties (e.g., provider and recipient) own or have respective mobile communication devices, such as wireless-capable smart phones or similar equipment enabled with hardware and software to carry out the present functions. In an embodiment, the provider mobile communication device 110 is a smart phone running a provider application. The provider mobile device 110 supports local wireless peer-to-peer communications like Bluetooth or infrared. The provider mobile device 110 also supports GPS or other location positioning technology and is connected through the wireless telecommunication network 160 to a retailer's server 130. In other embodiments, the provider mobile device 110 is a dedicated device manufactured for the purpose of accounting for and tracking of delivery packages, such as, tablets used by professional delivery service drivers or drivers employed by the retailers directly to deliver and distribute goods.

In the present embodiment, the recipient mobile communication device 120 is a smart phone running a recipient application. However, other portable devices meeting the following criteria are not beyond the scope of the present invention. The recipient mobile device 120 supports local wireless peer-to-peer communications like Bluetooth or infrared as well as general wireless communication functions commonly found on existing cellular smartphones. The recipient mobile device 120 supports GPS or other location positioning technology and is connected through the wireless telecommunication network 160 to the retailer's server 130. The recipient app can be used to securely access to information about an order. In some embodiments, the recipient app is also a shopping app which is used to place an online order with a retail server. One or more of the components of system 100 can therefore communicate over local and/or remote networks, including a cloud-based network 140.

Figure 2:
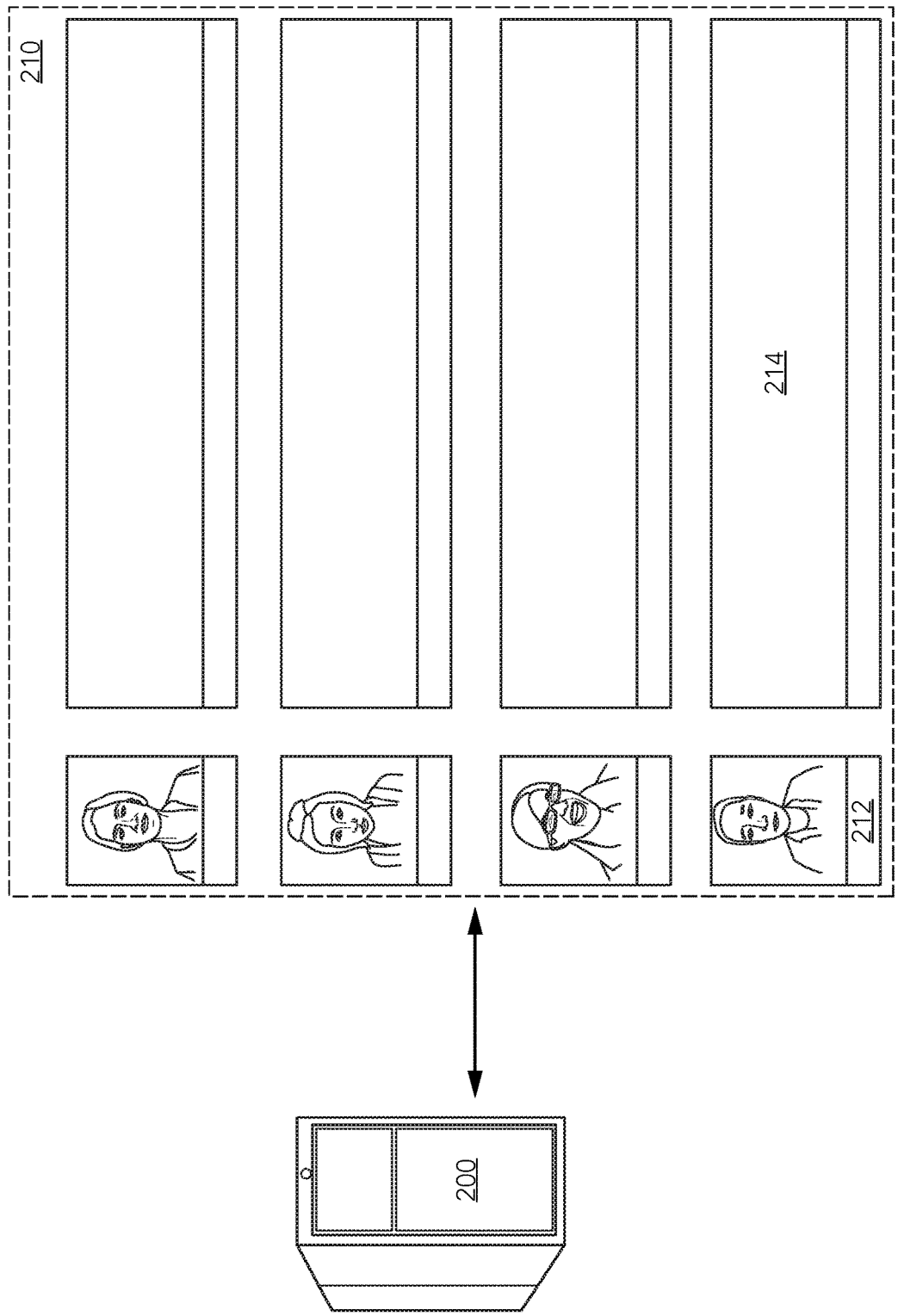
FIG. 2 is an exemplary server comprising, at least in part, a transaction ID database, in accordance with some embodiments of the disclosure provided herein.

FIG. 2 illustrates an exemplary transaction server 200 comprising, at least in part, an identity database 210 having multiple entries 214 relating to corresponding multiple retail users, customers or shoppers 212. The transaction server 200 may be implemented as part of a retail server system and may also comprise a delivery database and an order database. In some non-limiting examples, transaction server 200 may be configured and arranged, or may be coupled with a routing and fulfillment server as described by the present applicant in U.S. application Ser. No. 15/202,977, entitled "Method and System for Order Routing and Management", which is hereby incorporated by reference in its entirety. In one or more embodiments, the transaction server 200 interfaces with a webserver hosting an online shopping store and updates thereto accordingly, e.g., over a cloud-based network.

The identity database 210 stores information about the provider and recipient parties to a goods transfer event, which data can be used to authenticate the provider and the recipient. In one embodiment, passwords are used to authenticate provider and recipient. Passwords can be selected by users during a profile creation process or determined and disseminated by the retail server. Alternatively, secured and/or encrypted cookies are used to authenticate provider and recipient.

In one or more embodiments, the identity database 210 contains a profile photo 212 of a party, which could be used for authentication and discussed later in the disclosure as how it is used in practice.

A delivery database may comprise and record the delivery tasks involved in transferring an article from a provider to a recipient. Note that more than one stage may be involved in getting an article from its origin to its final destination, for example involving a plurality of handoffs of the goods from one provider to a recipient, the recipient in turn becoming a provider in the context of the subsequent handoff step. For comprehension, the present disclosure will generally focus on a single hop or task, insofar as there is one provider and one recipient and to prevent confusion when the recipient becomes the provider in a multiple task delivery chain. However, a plurality of delivery tasks is assuredly within the scope of the present invention.

The databases described herein may be implemented in separate physical computer storage devices, or may be implemented in separate memory address blocks in a same storage device as known to one of skill in the art, for example represented as "database" 135 in the previous drawing. An order database may also store information about the original order. As described, the order can be placed by a variety of methods comprising online (e.g., on a webpage), in-store terminal, a dedicated shopping app, such as one built into the recipient app.

Figure 3:
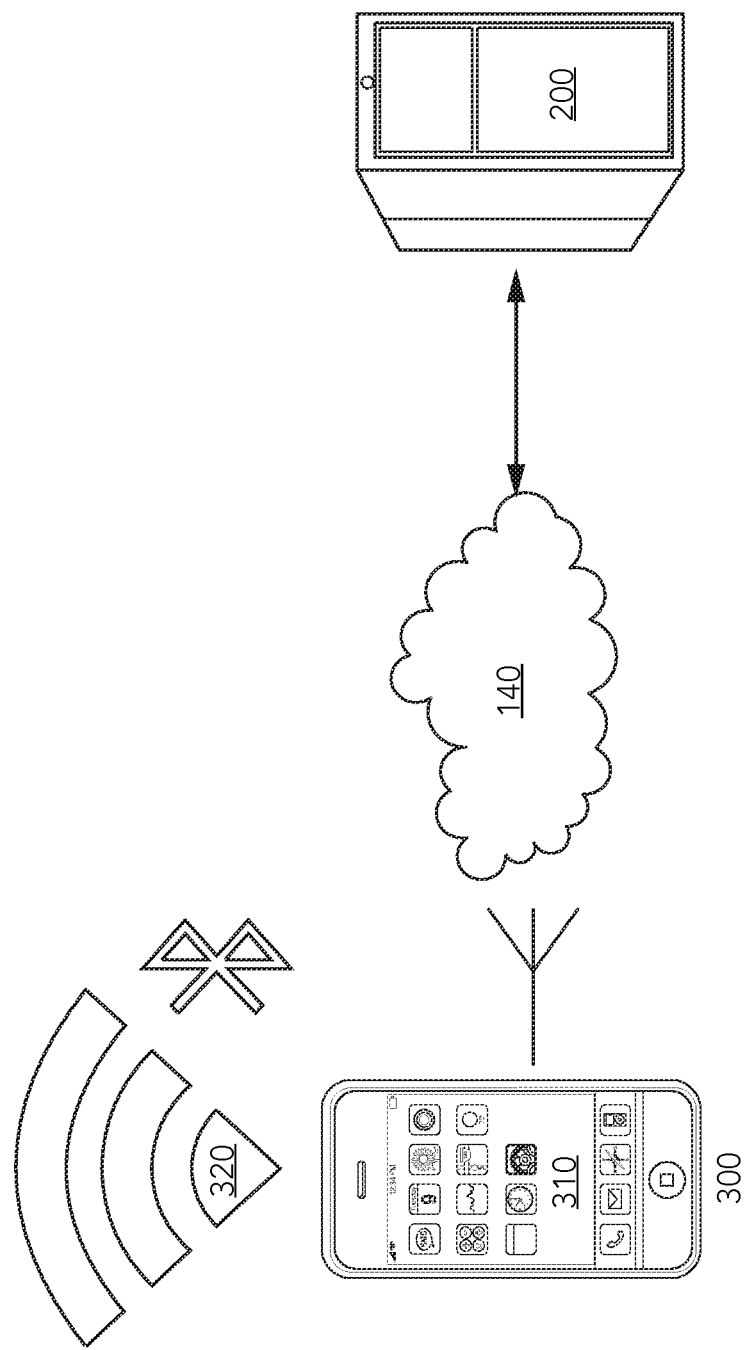
FIG. 3 is an exemplary mobile device comprising a global positioning system (GPS) and Bluetooth enabling the device to execute and run one or more of the disclosed applications, in accordance with some embodiments of the disclosure provided herein.

FIG. 3 represents an exemplary mobile communication device 300 comprising global positioning system 310 (GPS) hardware and software to determine a coarse (geographic) physical location of the device 300. The device 300 also comprises a short-range radio frequency communication circuit and associated software for short range communication with another device, e.g., using Bluetooth signals 320. So the mobile communication device 300 is configured and arranged, including with a plurality of wireless communication circuits and program instructions to perform over the air communications using at least two separate communication modes: one mode can communicate, e.g., over a cellular or wireless relay system 140 or 160 to a server 200 as described earlier, and another mode can communicate directly over the air using the short-range radio frequency (e.g., Bluetooth or similar mode) with another similarly equipped apparatus or mobile communication device, beacon, etc. In one embodiment, the mobile device 300 is a smartphone running a predetermined (provider or recipient) app in communication with a wireless telecommunication network. As discussed, any suitable local technology/protocol can be used, such as, Bluetooth, infrared transceiver, or Wi-Fi.

Figure 4:
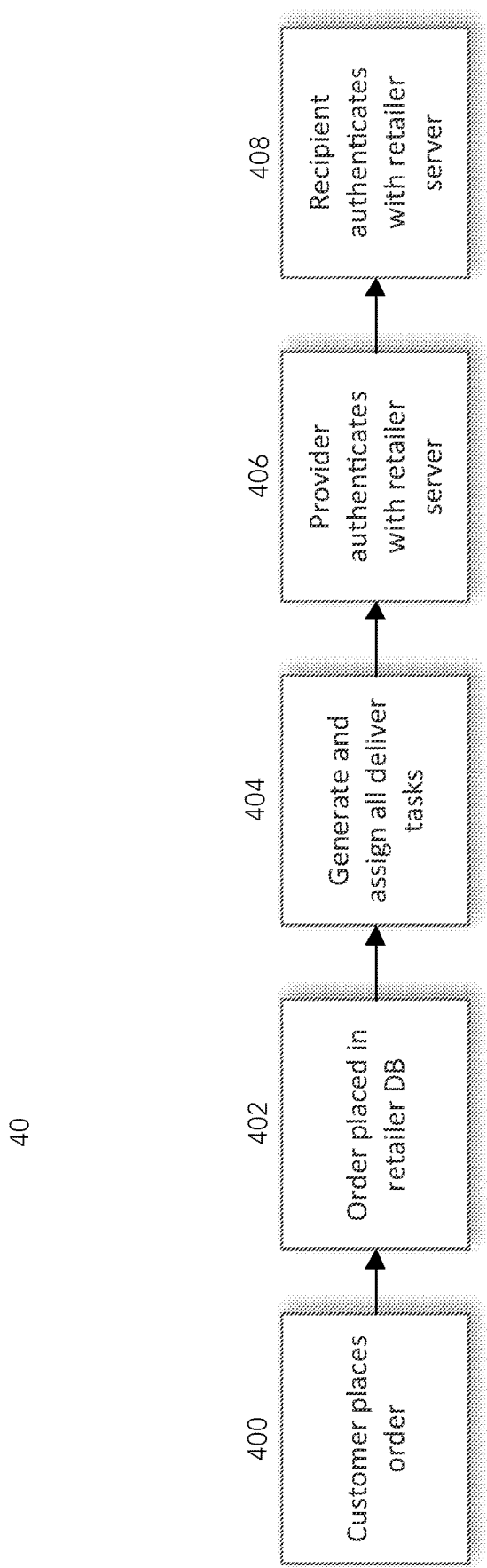
FIG. 4 is an exemplary flow chart demonstrating precursor events which take place prior to delivery and token handling, in accordance with some embodiments of the disclosure provided herein.

FIG. 4 is an exemplary flow chart representing a method 40 for demonstrating precursor events which take place prior to delivery and token handling. At step 400, a customer places an order using an aforementioned or any other suitable means. This order is stored at step 402 in an order database within the retail or transaction server.

In addition to other prescribed steps, the transaction server generates and assigns 404 the delivery tasks necessary to fulfill the order. That is, the transaction server determines all the necessary (or even alternate) hops to transfer the order from a source (e.g., warehouse) to a recipient chosen by the customer who placed the order. In some instances, the customer and recipient are the same entity but do not need to be, pursuant to the scope of the present invention.

At step 406, the provider uses the provider app on the provider's mobile communication device to authenticate with transaction server. In particular, the provider app interfaces with the identity database within the transaction server for authentication purposes. The communication with the retailer server can be made secure and encrypted as appreciated by those skilled in the art, e.g., using HTTPS or other suitable secure protocols.

The recipient uses the recipient app installed and running on the recipient mobile communication device to authenticate the recipient with transaction server at step 408. In particular, the recipient app interfaces with the identity database within the transaction server and authenticates using one or more of the aforementioned authentication methods as described above.

Secure confirmations with respect to the present transactions are accomplished using a token or digital key, e.g., a multi-digit numeric code, which is exchanged between multiple parties to a transaction, including custodians of an article to be transferred (the provider of an article to be transferred and the recipient of the article) as well as a transaction server assisting the parties in such a transfer of goods. The token (sometimes referred to as an authentication token herein) may be encoded in an over the air communication signal sent among the parties or over a communication network to or from the transaction server.

For enhanced security and authentication, some embodiments further provide for hashing of the authentication token using a hash code, which may be implemented at any of the mobile communication devices of the parties and/or at the transaction server. By using a corresponding or same hash function only known to the server and/or mobile communication devices the parties can be assured that the transaction or signals transferred among them are trusted and relevant to a given transfer of goods. However, in other embodiments, hashing the token is not required, for example if the token is transferred over an authenticated communication connection. The authentication of said connection serving as the assurance of the identity of each of the devices involved in the communication.

Figure 5:
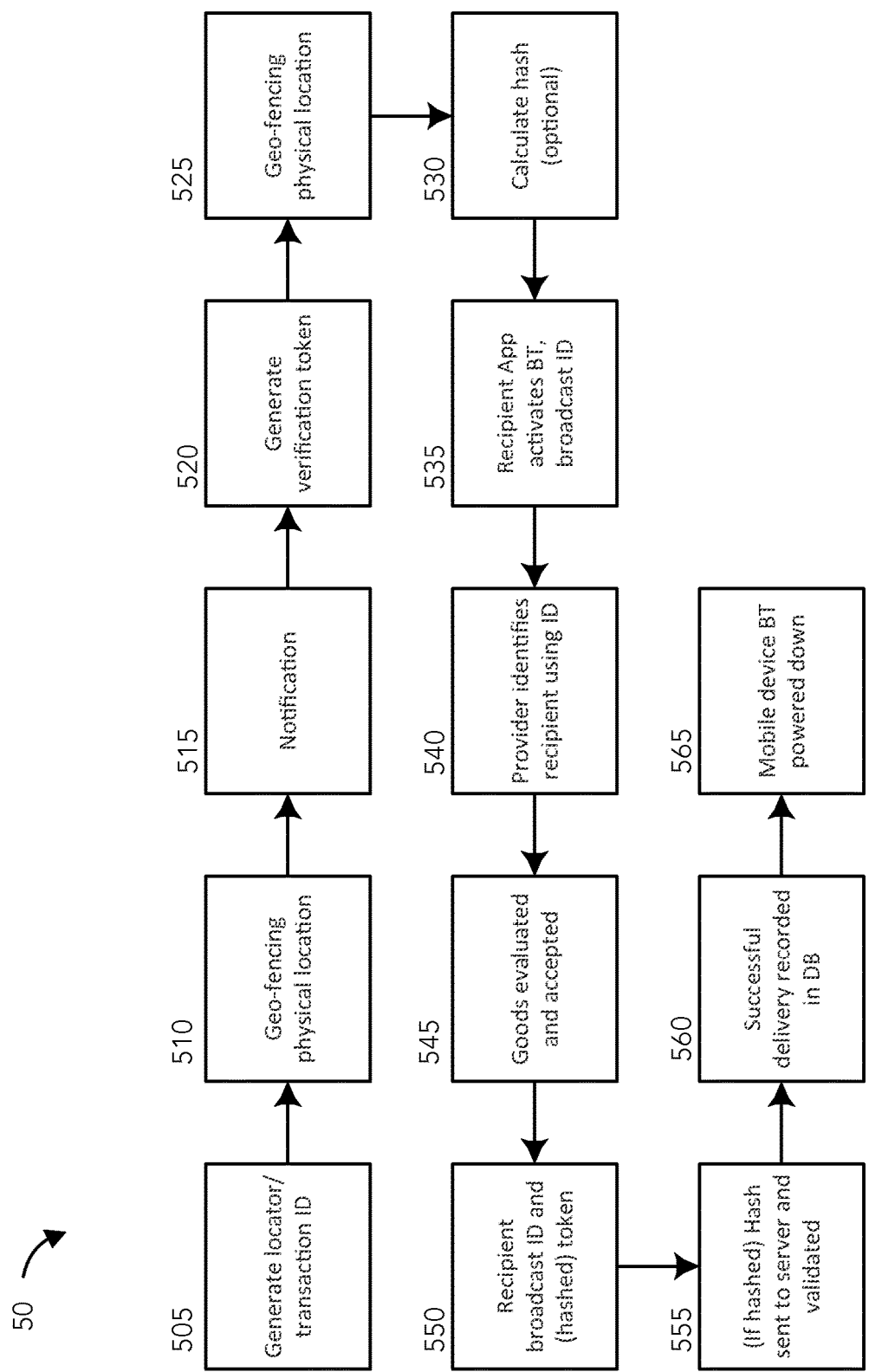
FIG. 5 is a diagram exemplifying the inventive process, at least in part, which occurs after the precursor events, in accordance with some embodiments of the disclosure provided herein.

FIG. 5 shows a flow chart 50 exemplifying an exemplary embodiment of the present method, which occurs after the precursor events described above. For each delivery task, the transaction server generates a recipient transaction identifier 505, which is a unique number. Ideally, but not necessarily, the recipient transaction identifier is unique user ID (UUID). A universal unique identifier is typically a 128-bit number used to uniquely identify some object or entity. The recipient transaction identifier is stored in the delivery database and is sent to (or read by) both provider and recipient apps.

It is noted that the scope of the present invention applies not only to delivery to fixed, static addresses but also to dynamic, person-to-person deliveries. As such, the smart phone app of the moving person (either provider or recipient) can continuously send position updates to the retailer server. In this fashion, the retailer server knows when the moving person is in proximity of the delivery location. Such a feature is also known as geo-fencing 510. A geo-fence is typically a virtual perimeter for a real-world geographic area. A geo-fence could be dynamically generated—as in a radius around a store or point location, or a geo-fence can be a predefined set of boundaries, like the perimeter of a retail store, school attendance zones or neighborhood boundaries.

In the instant example, the geo-fence is a virtual perimeter around the non-moving person and usage involves a location-aware device of a location-based service (LBS) user entering or exiting a geo-fence. This activity triggers an alert to the retail server as well as messaging to the geo-fence operator (person moving). In practice, both provider and recipient are dynamic. And thus, the virtual perimeter (e.g., radius) is a simply circumscribes a predefined area dynamically relative to the recipient.

In an alternate embodiment, the moving person can simply "check-in" at the delivery location. For example, through holding the smart phone next to a Bluetooth beacon or through simply affirming arrival by touching a button in app's user interface which notifies the retailer server that the person (either provider, recipient, or both) has arrived.

When the retailer server knows that the moving person has arrived, a notification 515 about the pending transfer of goods is sent to both the provider and recipient apps. When the recipient app receives the notification, the following occurs.

The recipient app generates a verification token 520, which is a random number in one embodiment, or a code generated from some seed number. This number is stored locally on the recipient's smart phone. In another embodiment, the retailer server generates the token and sends it to the recipient with the notification signifying a breach in the predetermined geo-fence at 525. The provider receives just the notification in some embodiments.

Regardless of the token genesis location, the recipient app may optionally calculate a hash function (or use a stored hash function) at 530, e.g., based on the transaction identifier/transaction identifier (or another piece of information specific to the transfer transaction) and the recipient token and sends that hash value to the retailer server. The server stores the value in the delivery database. As is known in the art, a hash function is any function that can be used to map digital data of arbitrary size to digital data of fixed size. The values returned by a hash function are called hash values, hash codes, hash sums, or simply hashes.

A cryptographic hash function allows one to verify that some input data maps to a given hash value, but if the input data is unknown, it is deliberately difficult to reconstruct it (or equivalent alternatives) by knowing the stored hash value. The present example may use the hash to disguise the recipient token. The actual value of the token is not relevant. It is desired to transmit something, which is calculated from the recipient token and can be verified but doesn't allow calculating the original value. This example is given by way of illustration, and those skilled in the art will appreciate other ways of carrying out the same or similar functions as well upon reviewing this disclosure.

The recipient app activates at 535 the local wireless radio and antenna (e.g., Bluetooth). The communication is not activated earlier because it would consume battery power. The app publicly advertises the recipient transaction identifier by broadcasting over the local wireless communication. In one embodiment, both transaction identifier and recipient token are publically broadcast over the air using Bluetooth communication signals sent from a Bluetooth transmitter or transceiver. In another embodiment, transaction identifier is first broadcast and recipient token is sent after a digitally secure handshake is performed authenticating provider and recipient to one another.

In an embodiment, when the provider app receives the notification from the retailer server, the provider app activates its local wireless radio receiver or transceiver (e.g., Bluetooth). In an example, the communication is not activated earlier to conserve device battery power. The provider app listens on local wireless communication and searches for the specific recipient transaction identifier and a handshake commences.

In an optional embodiment, provider app contacts the retailer server and downloads a profile photo of the recipient. Alternatively, the image could be sent to the provider with geo-fence notification or with the delivery task assignment itself. The photo can be shown on the provider smart phone and gives the provider additional verification of the recipient's identity.

The recipient may now verify at 545 the delivered goods and proceed with the next step, if the correct goods were delivered. In some embodiments, the recipient broadcasts the transaction identifier, and optionally a hashed verification token, as the provider is now in close-range of the recipient (e.g., a few meters, one meter, or less).

Both provider and recipient hold their phones at 550 in close proximity to each other, so that the local wireless communication takes place. Strictly speaking, bringing the phones close to each other is not necessarily required, as it would be sufficient that the phones are within reach (e.g., within a meter or so) proximity such as the case when phones are placed in provider's and recipient's pockets. This allows a complete automated authenticate without the provider or recipient reaching for their smart phones.

In some embodiments, one of the parties' mobile communication device broadcasts openly an identifier (which can be considered a transaction identifier) to assist the parties to the transfer in physically locating one another, e.g., at relatively short ranges. In an example, the recipient mobile communication device sends out such a transaction identifier over the air (this is just an example, and the other party may do so as well, or both parties may so broadcast). When the provider device and provider app receives and comprehends the recipient transaction identifier broadcast, a notification is sent to the server alerting of this fact. The broadcasting party is then alerted to add a second component into the broadcast (to send out a composite message or signal) containing both the transaction identifier and other handoff specific codes (e.g., a verification code). The provider (party receiving the broadcast ID) also thus reads the verification token which is also sent over the air. Reading the recipient token confirms that the provider is indeed in close proximity to the recipient because it's value is not known. The provider App then calculates a hash from the delivery number (or another piece of information specific to the delivery task) and the recipient token.

The provider app sends at 555 the calculated hash to the retailer server if a hash is used for added authentication. The retailer server compares the hash values sent from the provider app to the hash value already sent earlier by the recipient App stored in the delivery database. If the two are equal and match, the recipient is indeed in close proximity to the provider (or even holding phones close to each other).

In an optional embodiment, the retailer server sends a notification to the recipient App and requests in addition an explicit confirmation of the delivery. The recipient App displays a confirmation button which the recipient must first touch to actually confirm the delivery. This optional step adds a manual confirmation step to the automatic authentication and confirmation thereby providing additional security. It could be activated, for example, for high value goods.

The retailer server records at 560 the successful delivery in the delivery database. It also sends a confirmation about the successful authentication to the provider and recipient Apps. When the process is finished, the local wireless communication on both smart phones is turned off at 565 to conserve battery power.

If the hash values don't match or after a specific time out period, the retailer server will send a notification to the provider and recipient apps to re-initialize the process. This generates a new recipient transaction identifier and also requires the apps to send out position information again. This allows the retailer's server to verify again, whether the smart phones are at the delivery location and it starts a new secure authentication process with a new ID and token.

Accordingly, an embodiment comprises a token being generated by the recipient's app in the recipient's mobile communication device, and a corresponding hash created from said token is sent to a server The following enumerate some optional or alternate embodiments within the scope of the present invention. Instead of or in addition to the hash, just the token could be sent to the server and compared. Instead of or in addition to the hash, public/private key mechanisms could also be used to verify the identity of the recipient. Instead of or in addition to the hash, a one-time password can be exchanged.

Figure 6:
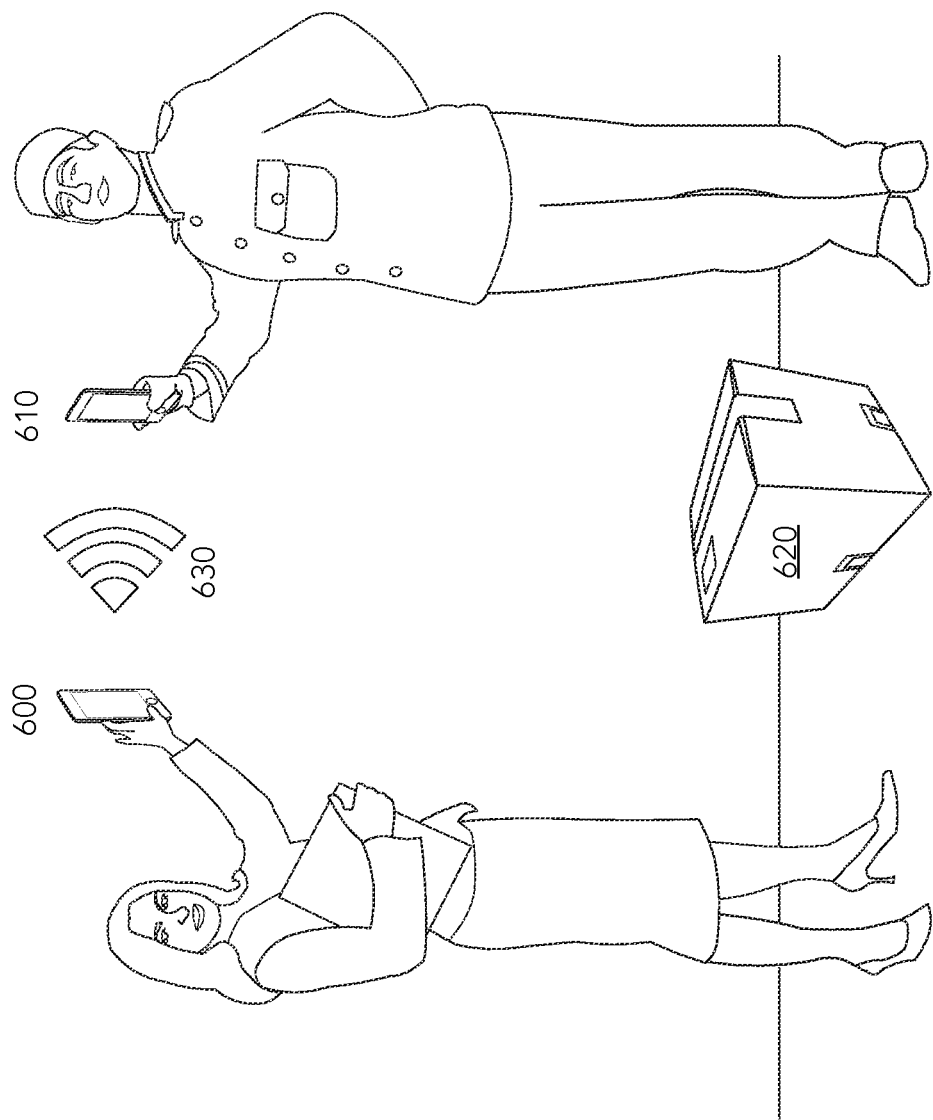
FIG. 6 depicts and exemplary token handoff and package exchange in practice, in accordance with some embodiments of the disclosure provided herein.

FIG. 6 is a representation of a two-party transaction to transfer an article of commerce 620 from a first party (provider) to a second party (recipient) according to the present disclosure and assisted by a first mobile communication device 610 associated with a first party to the transfer and a second mobile communication device 620 associated with a second party to said transfer. One or both of the two mobile communication devices 610, 620 devices are guided, e.g., using a GPS navigation or similar tool, towards a common geographic location of one another. A transaction server can monitor the relative geographic proximity or separation of the two parties as they come closer to one another. For example, if one of the parties is driving a delivery van towards the other. When the server determines that the parties are within a decided geographic proximity (nearness) of one another (for example, within 0.1 to 1 kilometer of one another if measured in distance to arrival, or alternatively within 1 to 30 minutes of one another if measured in arrival time), the server instructs one or both mobile communication devices 610, 620 to emit a short-range radio frequency communication signal using specialized hardware and software on the device(s) to send such signal (e.g., Bluetooth or similar communication 630) over the air. In some embodiments, both parties may be in transit and the transaction server is monitoring their relative approaches to a determined meeting location (i.e., both the provider and the recipient of the article move towards the meeting location).

The short-range signal is only received by the other party when in a relatively close proximity of the emitting device. The server can be informed with a message from one or both parties when they are within such short-range radio frequency communication distance, and specifically when they are within a certain short-range communication proximity (e.g., based on signal strength). When the two parties are within such short-range proximity for short-range wireless radio frequency communication (e.g., given a determined Bluetooth signal strength of each other) the devices can be held in relatively close proximity to each other. Those skilled in the art may appreciate that a range of several centimeters to several meters (e.g., under 10 meters) could be approximated as the short-range wireless communication range suited for this application. Other short-range wireless over the air communications are also possible, e.g., infrared data communication and other protocols as exist or become used by persons skilled in the art.

Figure 7:
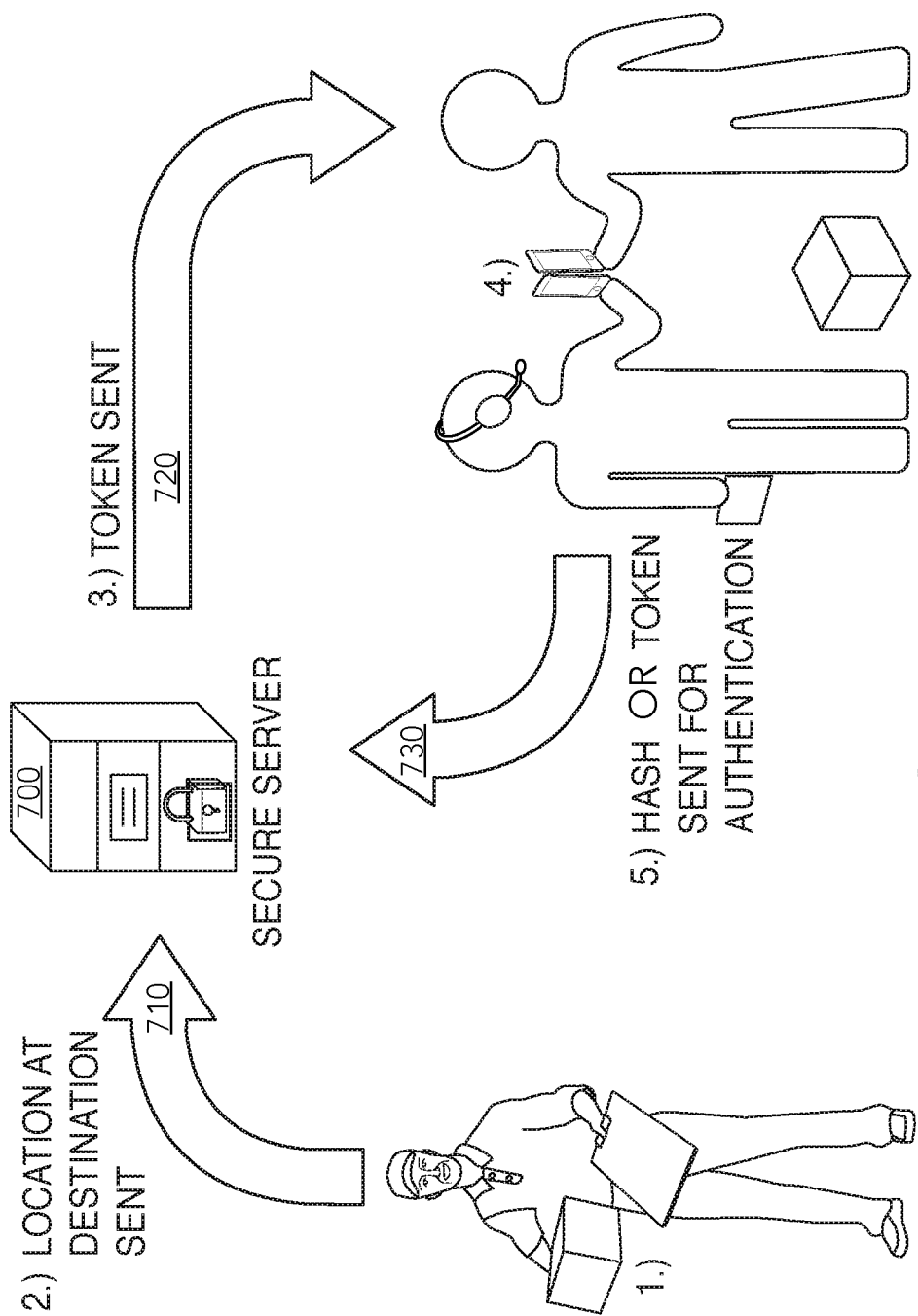
FIG. 7 is an exemplary abstraction illustrating the process flow of the arrival of delivery carrier and subsequent events for acceptance and confirmation, in accordance with some embodiments of the disclosure provided herein.

FIG. 7 is an exemplary abstraction illustrating the process flow of the arrival of a delivery carrier and subsequent events for acceptance and confirmation, in accordance with an alternate embodiment of the disclosure provided herein. The process flow commences when a delivery driver (provider custodian) arrives 710 at a destination or breaks the perimeter of the recipient custodian's geo-fence. A secure transaction server 700 sends 720 a notification and token to the recipient regarding the disposition of the provider. After the handshake, hand-off and acceptance occurs, hash and token are sent 730 to the server 700 for authentication and confirmation.

Figure 8:
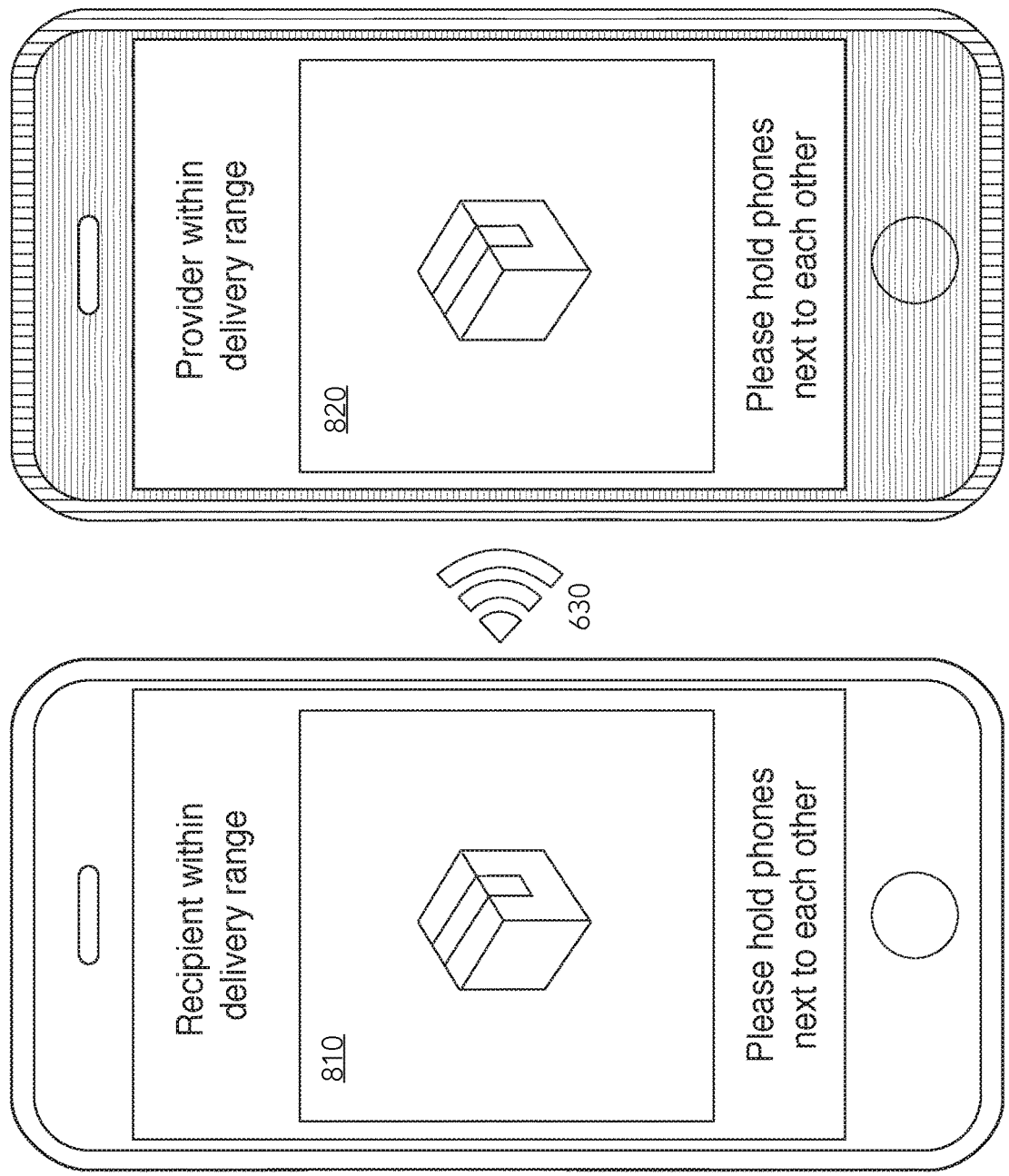
FIG. 8 represents graphical user interfaces (GUIs) demonstrating notification, handshake initialization and user instruction, in accordance with some embodiments of the disclosure provided herein.

FIG. 8 represents graphical user interfaces (GUIs) demonstrating notification, handshake initialization and user instruction, in accordance with some embodiments. As described, when two parties are within a predetermined physical proximity to achieve a goods transfer transaction, notifications 810, 820 are sent to both provider and recipient. Presumably within visual range, the provider and recipient are instructed to hold mobile devices within relative close proximity to one another in order to commence broadcast ID transmission and reception, in addition to token transfer. Again, a signal 630 having a short-range (e.g., less than 50 meters, or less than 10 meters, or less than 1 meter) can be used to affect device-to-device communications over such short-range radio frequency communication means. Also, an infra-red transponder in each device can be used to achieve the short-range communication therebetween. In yet other examples, a device "bumping" feature (whereby the devices are equipped with accelerometers and detect a simultaneous acceleration/deceleration event or bump) can ensure that the two parties to a goods transfer transaction are indeed in the required proximity of one another.

Figure 9:
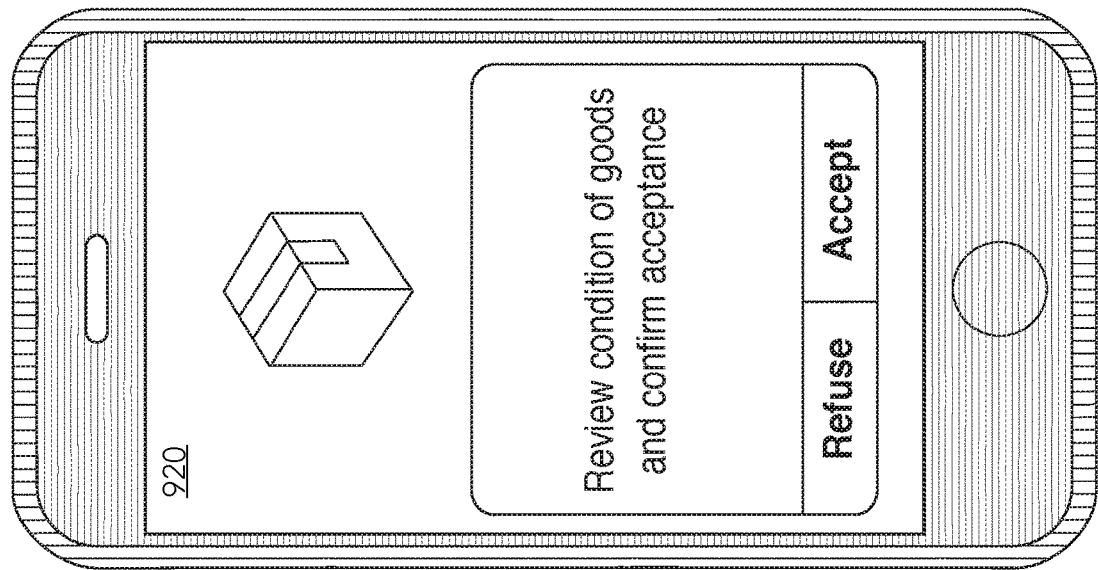
FIG. 9 represents graphical user interfaces (GUIs) demonstrating identity confirmation and package condition, evaluation, verification and acceptance, in accordance with some embodiments of the disclosure provided herein.
Figure 9:
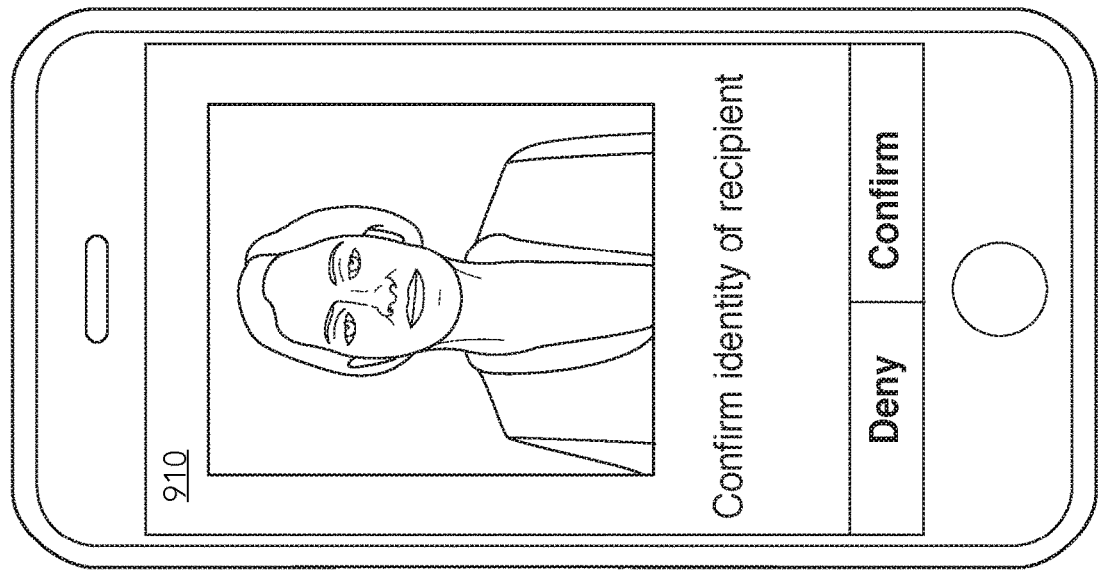

FIG. 9 represents graphical user interfaces (GUIs) demonstrating identity confirmation and package condition, evaluation, verification and acceptance, in accordance with some embodiments. As depicted on the left representing the provider app interface 910, the provider compares the image to recipient and is asked to confirm or deny visual identification. Depicted on the right GUI 920, a recipient is requested to accept or reject goods based upon evaluation and verification. Both are required for affirmative confirmation to be sent to the server.

Figure 10:
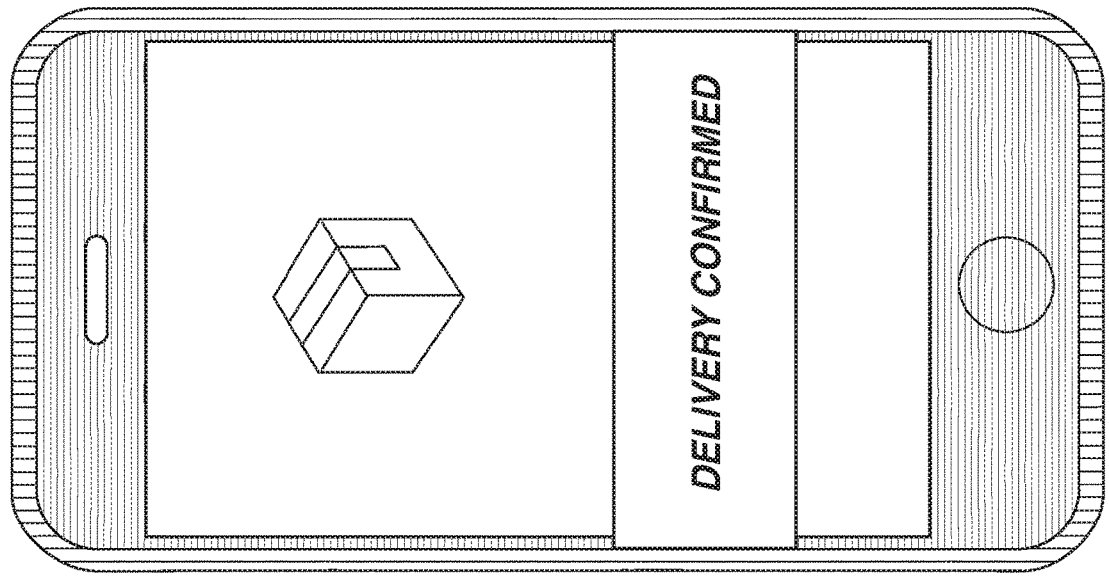
FIG. 10 represents graphical user interfaces (GUIs) demonstrating delivery confirmation, in accordance with some embodiments of the disclosure provided herein.
Figure 10:
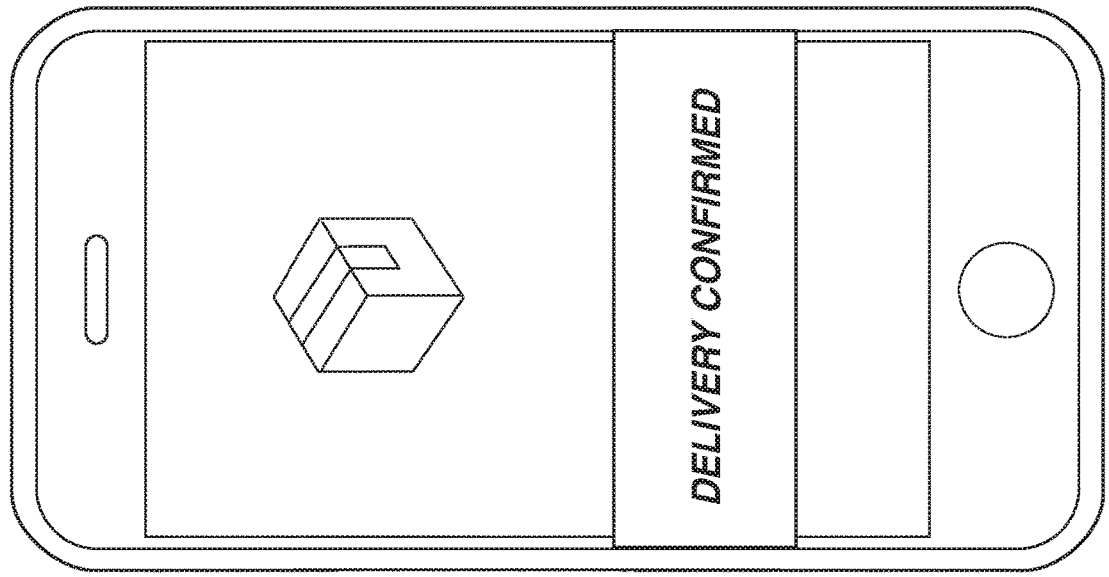

FIG. 10 represents graphical user interfaces (GUIs) demonstrating delivery confirmation, in accordance with one or more embodiments of the disclosure provided herein.

Figure 11:
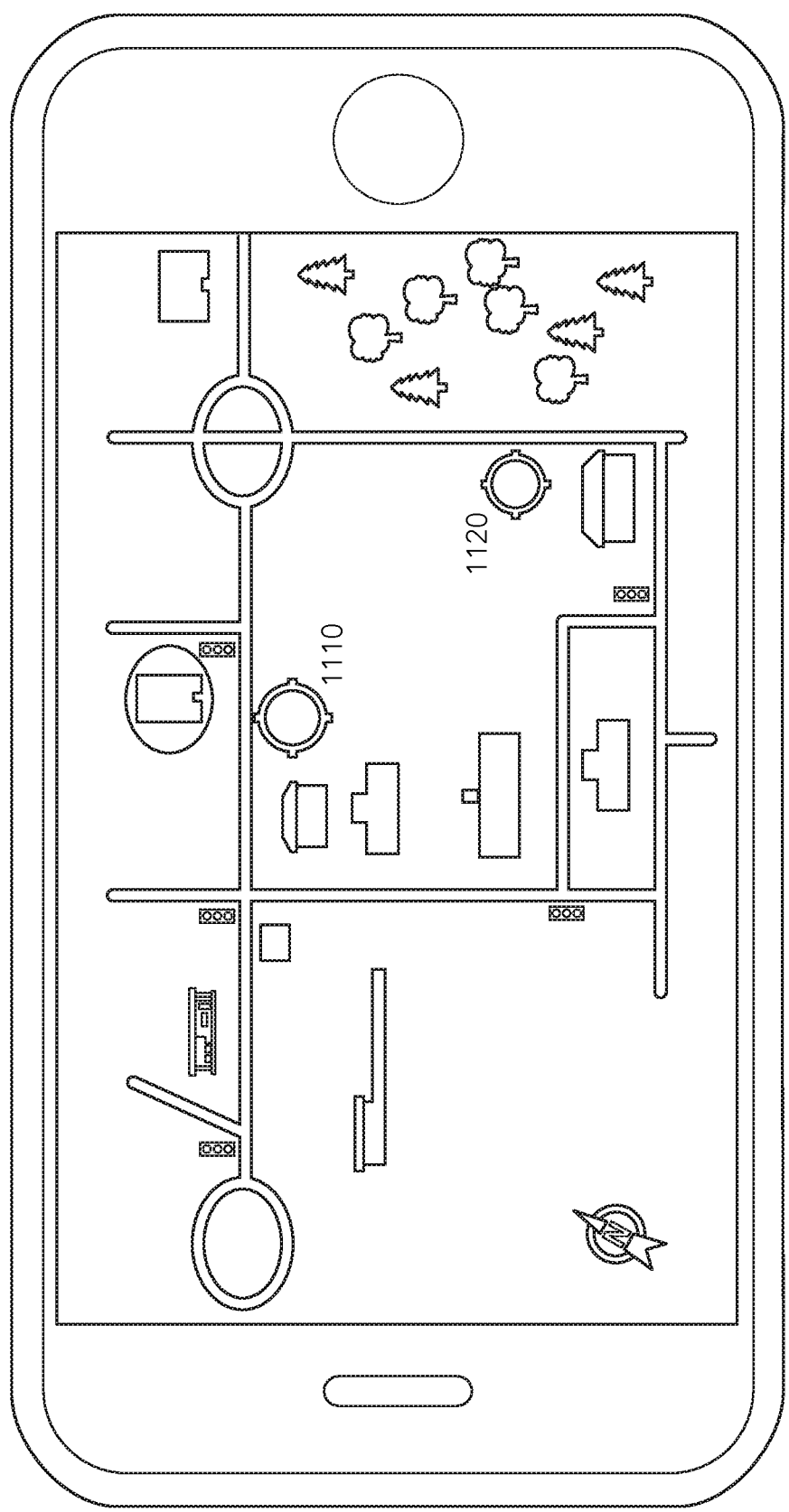
FIG. 11 represents graphical user interfaces (GUIs) constantly updating capacity of GPS for the possible delivery to a dynamic target location, in accordance with some embodiments of the disclosure provided herein.

FIG. 11 represents graphical user interfaces (GUIs) updating via GPS for delivery to a dynamic target location, in accordance with some embodiments hereof. Using a familiar GPS map environment, a provider 1110 is dynamically directed to a recipient 1120 in real time, for example using a mobile app on his or her mobile communication device, or optionally assisted by a transaction or navigation server. A server in communication with the wireless telecommunication network sends real-time updates to the provider 1110 so that the recipient 1120 has the ability to move and still receive a delivery.

Figure 12:
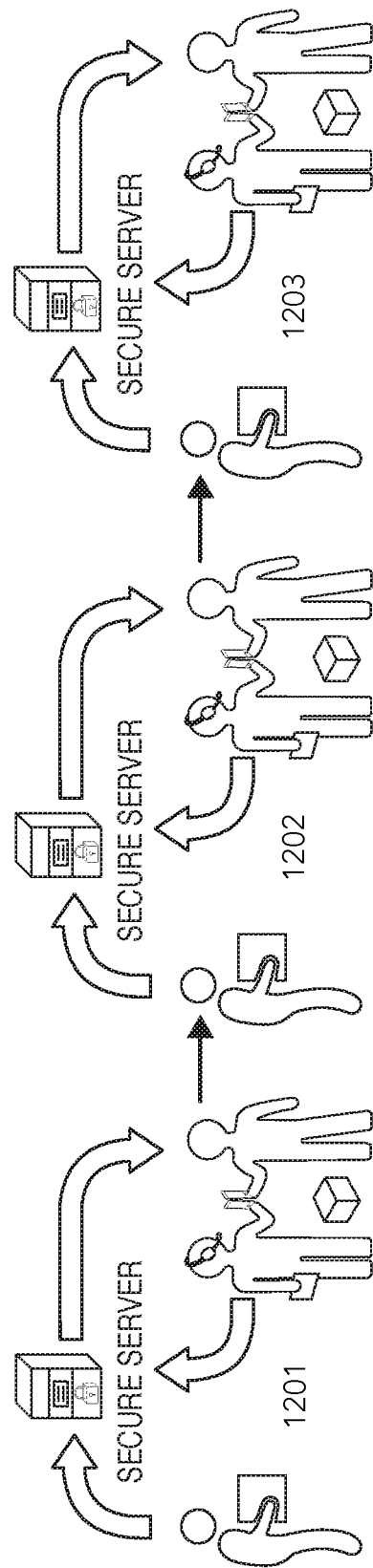
FIG. 12 is an exemplary cascade represent a multiple task delivery, in accordance with some embodiments of the disclosure provided herein.

FIG. 12 shows an exemplary cascade representing a multi-stage/multi-party delivery process wherein there are multiple providers, in accordance with some embodiments of the disclosure provided herein. As demonstrated each venue 1201-2013 represents a delivery task within a delivery chain. Additional delivery tasks are frequently required, e.g., when a worldwide carrier hands-off to a national or local carrier. In an embodiment, when a handoff occurs, a prospective recipient then becomes a provider according to the notation used herein. The process can be cascaded an arbitrary number of times while retaining security and accountability.

For an in-store pickup (e.g., "Click & Collect") scenario, a customer walks into the retail store to pick up the goods. In the retail store, different sales associates are available and could serve the customer. Any sales associate who wants to serve the customer would use his/her smart phone to act as a provider. The steps to complete the transaction are the following.

As described above, the recipient app notifies the retail server when the recipient arrives at the location where the transfer occurs. In this case, it would be the retail store where the goods are picked-up. A sales associate then activates the "Pick Up" screen in the provider app. This essentially replaces the automatic activation based on geo location described above.

The provider app then asks the retailer server for all delivery orders (here a pick-up) at the particular retail store where the recipient is in proximity and retrieves the associated recipient transaction identifiers. The provider mobile application (App) then activates its local wireless radio and antenna (Bluetooth) and searches for all recipient transaction identifiers received in the previous step. It's expected that only one of the IDs is found in close proximity because the recipient is standing with her smart phone in close proximity to the provider with her smart phone. And, only that recipient Transaction identifier will be detected. All additional steps are the same as described above. If there are still multiple transaction identifiers found, then additional information about the delivery task like the recipient names or a profile photo could be displayed. This then allows the provider to pick the right recipient and with that also select the right transaction identifier.

In one or more embodiments authentication is delegated to another. For example, a customer can't receive a delivery asks a friend to pick up the goods in a retail store or accept a delivery. Consequently, an additional step is necessary as follows. The customer (normally the recipient) must first authorize another. This disclosure refers to this person as a delegate recipient. The delegate recipient must have a smart phone with a recipient app as well as a profile on the retailer server.

Figure 13:
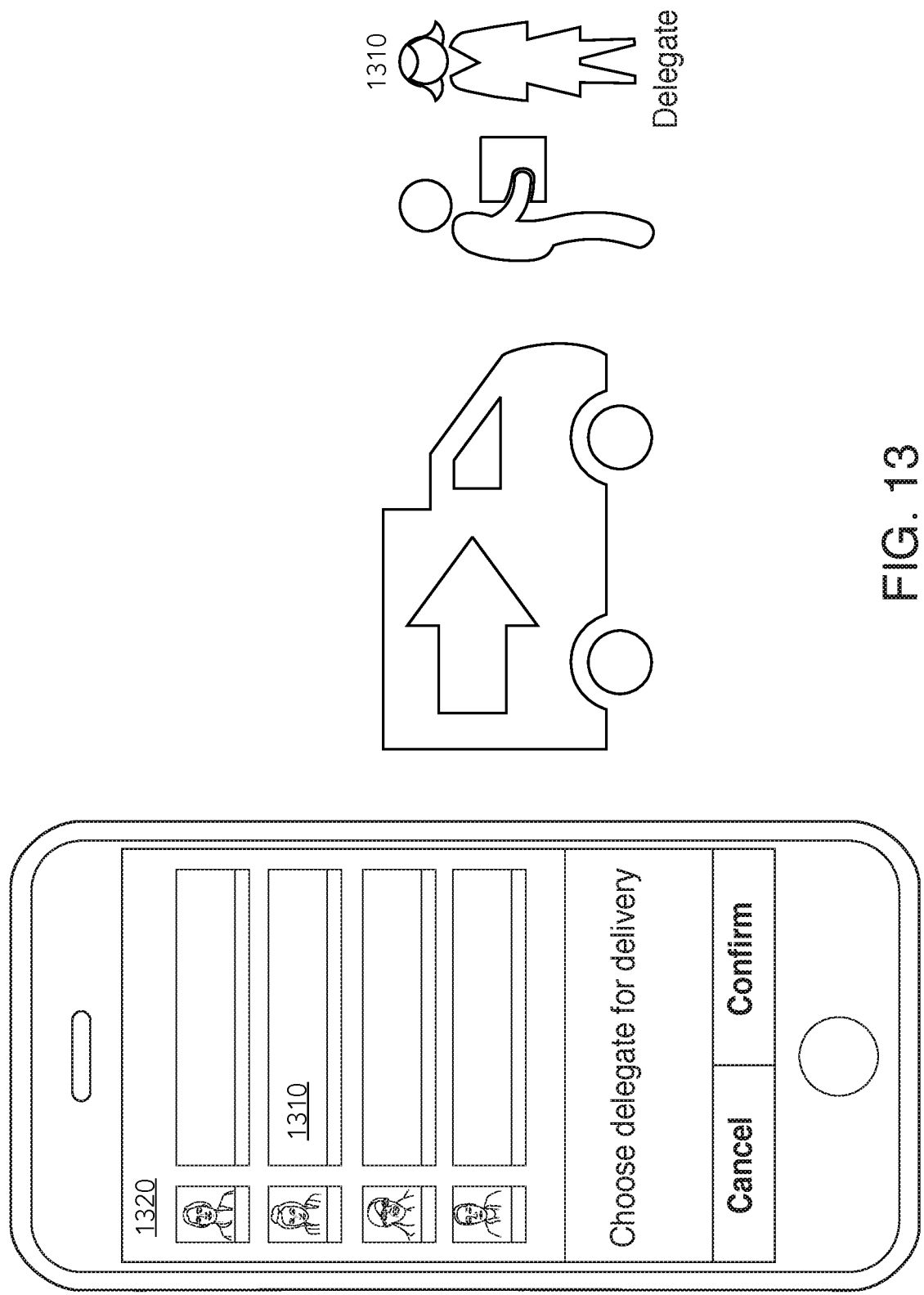
FIG. 13 is an exemplary process assigning a delegate and delivery thereto, in accordance with some embodiments of the disclosure provided herein.

FIG. 13 shows an exemplary process for assigning a delegate and delivery thereto, in accordance with some embodiments of the disclosure provided herein. In the present embodiment, a delegate 1310 is chosen by a consumer using a predetermined phone app. The delegate 1310 must already be in the retail server ID database. In other embodiments, the consumer inputs the delegates contact information (e.g., e-mail address, etc.), and the retail server sends the delegate an invitation to complete a sign up and verification process.

As depicted in FIG. 13, the consumer scrolls through the consumer App's networked contacts 1320 and designates a delegate for a prospective delivery. In some embodiments, the consumer can select a default delegate, such as a spouse, another family member, a neighbor, or a friend. Upon approvals and notification, delivery is executed pursuant to the aforementioned process, wherein a delivery driver 1330 makes contact with the recipient (delegate 1310), electrically communicates therewith and performs a delivery.

More specifically, the customer (original recipient) uses the recipient app to instruct the retailer server that the delegate recipient 1310 is authorized to authenticate and confirm a specific delivery task. This happens, for example, by sending a command from the recipient app to the retail server, which contains the number of the delivery task and the delegate recipient customer number (or email address, etc.). The customer number (or email address) is used to identify the delegate recipient 1310. Alternatively, other identification information could be used, for example the phone number, a social media login or other suitable means which uniquely identifies the delegate 1310.

When the delegate recipient 1310 is authorized, the recipient mobile application (app) on the delegate recipient's 1310 phone has access to the specific delivery task scheduled for the original recipient. It can read all information like the delivery task number and the recipient transaction identifier. The process works then the same way as for the original recipient. As an additional step the retailer server sends a notification of the successful delivery to the original recipient's app.

In other embodiments, the app can be used as an escrow in a private party transaction. An escrow is a contractual arrangement in which a third party receives and disburses money or documents for the primary transacting parties, with the disbursement dependent on conditions agreed to by the transacting parties.

Aspects of the present disclosure permit secure transactions and exchanges of information, tokens or data. For example, where the provider's mobile communication device, the server and service infrastructure, and the receiver's mobile communication device are not compromised, the present system and method should be able to resist tampering or unauthorized access.

In another embodiment or aspect, a public key may be used to facilitate a transaction. The server may generate two public/private key pairs. One public key is sent to the recipient app while the other public key is sent to the provider app, each app running on the respective mobile communication devices of the recipient and the provider. The recipient app encrypts the token using its public key and sends the encrypted token to the server. The recipient app also broadcasts the token over the air using radio frequency (RF) communication signals, which can be received by the provider mobile device and provider app. Once received, the provider app encrypts the token using the provider's public key and sends that encrypted token to the server. Since the server has the private keys to decrypt the received tokens, the server can compare and confirm the sameness of the received tokens from the receiver and the provider parties. Therefore, in some embodiments, both the receiver and the provider are required to be in possession of suitable secrets (a hash function or a public key) to consummate the exchange. This avoids unauthorized third party eavesdroppers from picking up a token over the air (the wireless RF signal) and using the same for an unauthorized purpose.

As appreciated by those skilled in the art, while the present discussion includes concepts of authentication, security and privacy, authenticated communications would preferably not only include a secure connection that resists tampering or intrusion, but also ensures that a party to the communication is confident of the proper identity of the other party to said communication and not an imposter or unauthorized party. Several additional aspects can further aid in authenticating a communication connection, including in the communication device having a user interface or credentials taking step for accepting a login name and password, or hardware for sensing a biometric so as to confirm that the person using the device is the actual intended proper owner or user in the context of the transaction. Fingerprint sensor pads, retina scan imagers, voice recognizers and other such biometric confirmation hardware and software are comprehended by this disclosure.

Figure 14:
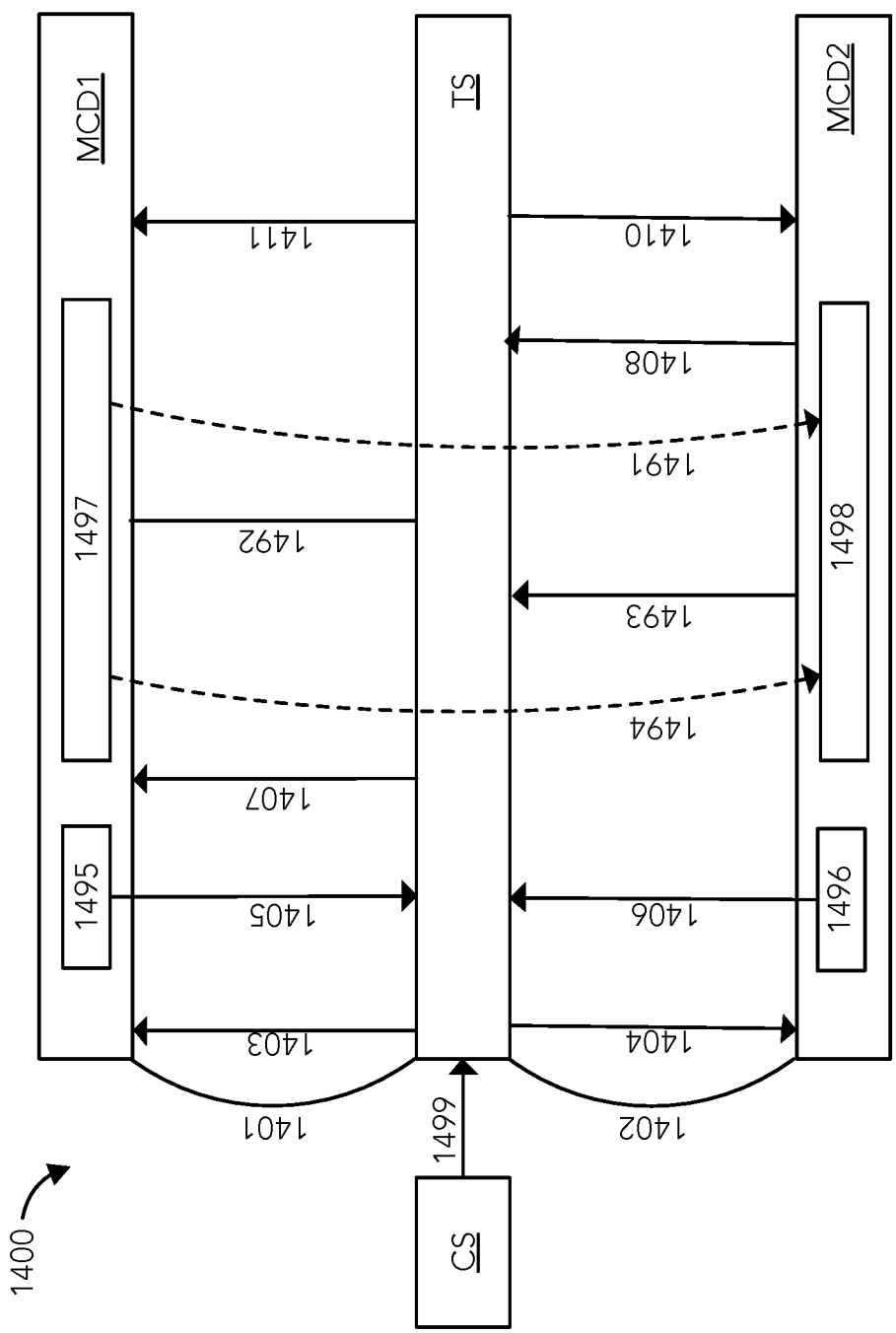
FIG. 14 illustrates a representation of a process using a transaction server for causing a transfer of an article between a first custodian and a second custodian.

FIG. 14 illustrates a representation of a process 1400 using a transaction server (TS) for causing a transfer of an article between a first custodian and a second custodian. Either custodian can be the provider party of the article and the other custodian being the recipient in this context. An article of commerce, e.g. goods being sold and delivered, are identified at 1499 by a commerce server (or alternatively by a human seller) to the transaction server TS, including by sending to the transaction server TS a transaction identification data identifying the particular transaction giving rise to the transfer of the instant article.

In practice, the first custodian owns or is a user of a first mobile communication device (MCD1) and the second custodian owns or is a user of a second mobile communication device (MCD2), such as a wireless communication equipped smartphone, as depicted and described earlier. An authenticated pair of communication connections is established at 1401 and 1402 between server TS and the devices MCD1 and MCD2, respectively. As mentioned before, the connections can be made using a secure communication protocol and may physically employ one or more communication pathways including wired and/or wireless communication pathways. A messaging server (e.g., Wi-Fi, cellular data or other), cloud based network, or other communications infrastructure can assist in establishing the connections at 1401 and 1402 as understood by those skilled in the art.

Each of said first and second mobile communication devices MCD1 and MCD2 is equipped with at least a processor, a memory unit, a geographic location circuit (e.g., GPS), and circuitry for carrying out communications with the transaction server as well as circuitry for carrying out communications over the air using a short-range wireless communication modality (e.g., Bluetooth radio frequency communication, infrared communication, etc.).

At 1403, 1404, the transaction server TS sends to both MCD1 and MCD2 a signal encoding the transaction identifier data as well as any other information needed by MCD1 and MCD2 to conduct the transfer of the article from one of the custodians to the other. For example, TS may send to each of MCD1 and/or MCD2 a transfer location, which may be the location of the provider, the location of the recipient, or another location to which both the provider and the recipient are to proceed. Of course, to accomplish the transfer of custody of the article, both the provider and the recipient need to be substantially at a same place, preferably also at the same time so as to affect a physical handoff of the article from one of them to the other. As noted elsewhere, delegates and intermediary transfers are comprehended by this disclosure, which can therefore involve multiple parties and multiple delivery and transfer stages.

Each of said first and second mobile communication devices sends its geographic location data signals at 1405, 1406 respectively, to the transaction server TS. Geographic location circuitry 1495 and 1496 in each of MCD1 and MCD2, respectively, generates an output (data, signal) indicative of a geographic location or relative position of devices MCD1, MCD2. These outputs are used to compute a relative location or relative separation or proximity (as measured in space or in time) separating the custodians and their mobile communication device. Meaning, the server TS can determine from geographic location outputs on the mobile communication devices a distance separating the mobile communication devices, or a time of travel estimated between them.

When the transaction server TS determines that the parties (or more accurately, their mobile communication devices MCD1, MCD2) are within a pre-determined geographic proximity of one another, the transaction server TS sends a signal to MCD1 at 1407 instructing MCD1 to broadcast a wireless signal or beacon 1494 over the air to its surrounding environment, the broadcast being caused by a short-range wireless communication circuit 1497 disposed in device MCD1, e.g., a Bluetooth transmitter or transceiver or other short-range transmitter. In an embodiment, the short-range transmission has a limited power and a limited effective range, e.g., under 100 meters, under 10 meters, or under 1 meter as measured radially from MCD1.

The short-range wireless communication signal 1494 broadcast by a short-range wireless transmitter of the first mobile communication device MCD1 encodes the transaction identifier data mentioned above, and is received by a short-range wireless receiver of the second mobile communication device MCD2 when MCD2 is within the appropriate range of MCD1, depending on the transmission conditions and other environmental factors. When MCD2 receives short-range wireless signal 1494 MCD2 uses an onboard processor to decode, parse or otherwise establish information contained in signal 1494. If MCD2 confirms the presence of the transaction identifier data in signal 1494 MCD2 can confirm to the second custodian that indeed he or she is within a relatively short distance of the first custodian because the transaction identifier data 1499 corresponds to the purpose of the present transaction.

The second mobile communication device MCD2 establishes when the first and second mobile communication devices are within a pre-determined short-range communication proximity of one another, for example using the signal strength of the short-range wireless broadcast signal 1494 as a basis for estimating such a proximity. When MCD2 has established that MCD1 and MCD2 are within said pre-determined short-range wireless communication proximity (e.g., within 10 meters, or within 1 meter or several centimeters of one another), MCD2 sends a proximity confirmation signal 1493 to the transaction server TS.

Now that transaction server TS is informed that the parties (the first and second custodians, MCD1, MCD2) are within short-range proximity of one another the transaction server TS exchanges a verification token at 1492 with the first mobile communication device MCD1. The verification token will be used to secure the present transfer and avoid man-in-the-middle fraud or mistakes in handing the goods to the wrong recipient as will be explained below. The verification token can be generated by either MCD1 itself, or may be provided by server TS to MCD1 in alternative embodiments, therefore the drawing does not specify a directionality for the verification token at this step because it can be moved from either TS to MCD1 or the other way around. Those skilled in the art will appreciate throughout this disclosure that implementation details such as the latter point can be made in numerous ways being equivalent or achieving substantially the same end, all of which are intended to be covered by this disclosure.

Once the verification token has been exchanged by the transaction server TS and the first mobile communication device MCD1 (meaning, each of TS and MCD1 has the verification token), and having confirmed that both MCD1 and MCD2 are within short-range wireless communication proximity of each other, MCD1 proceeds to broadcast over the air using its short-range wireless communication transmitter (or transceiver) a composite signal at 1491 encoding or comprising both the transaction identifier data as well as the verification token.

The second mobile communication device MCD2, now having information including the verification token, sends its copy of the verification token to the transaction server at 1408. The transaction server TS can compare and confirm that the second mobile communication device MCD2 is thus in possession of the proper verification token (the same or corresponding to the verification token exchanged between TS and MCD1 earlier), and therefore at 1410 and 1411 the transaction server TS can instruct both mobile communication devices MCD1, MCD2 to proceed with transferring the article from the custodian holding the article to the other custodian in the transaction.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will appreciate the many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A method for causing a transfer of an article between first and second custodians of said article, comprising:
coupling a transaction server, over at least one wireless communication path, using respective authenticated communication links, so as to establish respective authenticated communication links with each of a first mobile communication device co-located with the first custodian, and a second mobile communication device co-located with the second custodian;
providing from said transaction server to the first and second mobile communication devices respective digital messages comprising transaction identifier data and other data regarding said transferring of the article from the first custodian or the second custodian to the other;
determining, at said transaction server, respective physical locations of said first and second mobile communication devices with respect to one another based at least partly on respective first and second location data generated respectively by first and second geographic location circuits disposed in each of the corresponding first and second mobile communication devices;
when said first and second mobile communication devices are within a pre-determined geographic proximity of one another, the transaction server instructing the first mobile communication device to broadcast over the air a short-range wireless radio frequency signal including at least said transaction identifier data using a first short-range wireless radio frequency communication transmitter therein;
at the second mobile communication device, using a second short-range wireless radio frequency communication receiver to receive said short-range wireless radio frequency signal from the first mobile communication device, confirming the presence of said transaction identifier data in the short-range wireless radio frequency signal, and using the short-range wireless radio frequency signal to determine when said first and second mobile communication devices are within a pre-determined short range communication proximity of one another;
when the second mobile communication device has confirmed the presence of said transaction identifier data and determined that said first and second mobile communication devices are within said pre-determined short-range communication proximity of one another, the second mobile communication device sending a proximity confirmation signal to the transaction server indicating that the first and second mobile communication devices are within said pre-determined short-range communication signal proximity of one another;
after receiving said proximity confirmation signal from the second mobile communication device, the transaction server and the first mobile communication device exchanging a verification token with one another;
while the first mobile communication device broadcasts the short-range wireless radio frequency signal including said transaction identifier, the first mobile communication device receiving an alert from the transaction server to add the verification token to the short-range wireless radio frequency signal including said transaction identifier, the alert causing said first mobile communication device to wirelessly broadcast over the air, using said short-range wireless radio frequency, a composite signal comprising both the transaction identification data as well as the verification token;
at the second mobile communication device, using a respective second short-range wireless radio frequency receiver to receive the composite signal including the verification token from the first mobile communication device and sending the received verification token from the second mobile communication device to the transaction server;
at the transaction server, confirming that the verification token received from the second mobile communication device corresponds to the verification token exchanged with the first mobile communication device; and
upon successfully confirming said verification tokens, the transaction server sending article transfer confirmation signals to each of the first and second mobile communication devices so as to effect a transfer of said article from the custodian having custody of the article to the other custodian.

2. The method of claim 1, wherein said first custodian associated with the first mobile communication device is a provider of the article to be transferred, and the second custodian associated with the second mobile communication device is a recipient of the article to be transferred.

3. The method of claim 1, wherein said first custodian associated with the first mobile communication device is a recipient of the article to be transferred, and the second custodian associated with the second mobile communication device is a provider of the article to be transferred.

4. The method of claim 1, determining said physical locations of the first and second mobile communication devices comprising using global positioning system (GPS) data from each of the mobile communication devices.

5. The method of claim 1, the short-range wireless communication steps being carried out using Bluetooth communications.

6. The method of claim 1, said transaction server being a cloud-based server, and coupling said transaction server with the mobile communication devices comprising establishing a communication path including at least one cloud-based communication link between each respective mobile communication devices and said transaction server.

7. The method of claim 1, wherein coupling said transaction server with the mobile communication devices comprises establishing a communication path including at least one cellular data communication link between each respective mobile communication devices and said transaction server.

8. The method of claim 1, exchanging said verification token comprising generating the verification token in said transaction server and sending the verification token from the transaction server to the first mobile communication device.

9. The method of claim 1, exchanging said verification token comprising generating the verification token in said first mobile communication device and sending the verification token from the first mobile communication device to the transaction server.

10. The method of claim 1, further comprising sending, from at least one of the mobile communication devices, a transfer confirmation signal to the transaction server, indicating that the article has been physically transferred between the custodians.

11. The method of claim 1, said step of broadcasting the composite signal comprising packaging both of said transaction identifier data and said verification token into a single digital transmission message transmitted over said short-range wireless radio frequency.

12. The method of claim 1, determining that the mobile communication devices are within said short-range communication proximity of one another comprising measuring, at one of said mobile communication devices, a signal strength of a short-range wireless radio frequency emission transmitted by the other one of said mobile communication devices.

13. The method of claim 1, determining that the mobile communication devices are within said short-range communication proximity of one another comprising measuring an accelerometer signal in each of said devices so as to determine a mutual bump indicating physical contact between said mobile communication devices.

14. The method of claim 1, further comprising hashing said verification token using a private hash function at any of said transaction server and said mobile communication devices to further authenticate said verification token.

15. The method of claim 1, further comprising exchanging said verification token among said devices and said server using a public-private key pair.

16. The method of claim 1, further comprising after the transaction server receives said proximity confirmation signal from the second mobile communication device, the transaction server sending (a) a photographic image of the second custodian to the first mobile communication device or (b) a photographic image of the first custodian to the second mobile communication device.

17. A method for causing a transfer of an article between first and second custodians of said article, comprising:

coupling a transaction server, over at least one wireless communication path, using respective authenticated communication links, so as to establish respective authenticated communication links with each of a first mobile communication device co-located with the first custodian, and a second mobile communication device co-located with the second custodian;

providing at said transaction server, delivery task information indicating that the article is to be transferred from one of the first custodian and the second custodian to the other;

after said providing at said transaction server, delivery task information indicating that the article is to be transferred from one of the first custodian and the second custodian to the other:

providing from said transaction server to the first and second mobile communication devices respective digital messages comprising transaction identifier data and other data regarding said transferring of the article from one of the first custodian and the second custodian to the other;

determining, at said transaction server, respective physical locations of said first and second mobile communication devices with respect to one another based at least partly on respective first and second location data generated respectively by first and second geographic location circuits disposed in each of the corresponding first and second mobile communication devices;

when said first and second mobile communication devices are within a pre-determined geographic proximity of one another, the transaction server instructing the first mobile communication device to broadcast over the air a short-range wireless radio frequency signal including at least said transaction identifier data using a first short-range wireless radio frequency communication transmitter therein;

at the second mobile communication device, using a second short-range wireless radio frequency communication receiver to receive said short-range wireless radio frequency signal from the first mobile communication device, confirming the presence of said transaction identifier data in the short-range wireless radio frequency signal, and using the short-range wireless radio frequency signal to determine when said first and second mobile communication devices are within a pre-determined short range communication proximity of one another;

when the second mobile communication device has confirmed the presence of said transaction identifier data and determined that said first and second mobile communication devices are within said pre-determined short-range communication proximity of one another, the second mobile communication device sending a proximity confirmation signal to the transaction server indicating that the first and second mobile communication devices are within said pre-determined short-range communication signal proximity of one another;

after receiving said proximity confirmation signal from the second mobile communication device, the transaction server and the first mobile communication device exchanging a verification token with one another;

while the first mobile communication device broadcasts the short-range wireless radio frequency signal including said transaction identifier, the first mobile communication device receiving an alert from the transaction server to add the verification token to the short-range wireless radio frequency signal including said transaction identifier, the alert causing said first mobile communication device to wirelessly broadcast over the air, using said short-range wireless radio frequency, a composite signal comprising both the transaction identification data as well as the verification token;

at the second mobile communication device, using a respective second short-range wireless radio frequency receiver to receive the composite signal including the verification token from the first mobile communication device and sending the received verification token from the second mobile communication device to the transaction server;

at the transaction server, confirming that the verification token received from the second mobile communication device corresponds to the verification token exchanged with the first mobile communication device; and upon successfully confirming said verification tokens, the transaction server sending article transfer confirmation signals to each of the first and second mobile communication devices so as to effect a transfer of said article from the custodian having custody of the article to the other custodian.

18. The method of claim 17, further comprising after the transaction server receives said proximity confirmation signal from the second mobile communication device, the transaction server sending (a) a photographic image of the second custodian to the first mobile communication device or (b) a photographic image of the first custodian to the second mobile communication device.

* * * * *